(12) United States Patent
Tabata et al.

(10) Patent No.: US 8,349,273 B2
(45) Date of Patent: Jan. 8, 2013

(54) MICROREACTOR DEVICE

(75) Inventors: Kazuaki Tabata, Kanagawa (JP);
Yoshihisa Yamazaki, Kanagawa (JP);
Masaki Hirota, Kanagawa (JP);
Takayuki Yamada, Kanagawa (JP);
Daisuke Nagao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 552 days.

(21) Appl. No.: 12/185,464

(22) Filed: Aug. 4, 2008

(65) Prior Publication Data
US 2009/0098027 A1    Apr. 16, 2009

(30) Foreign Application Priority Data
Oct. 12, 2007  (JP) ................. 2007-266414

(51) Int. Cl.
*B01L 3/00* (2006.01)
*G01N 1/10* (2006.01)

(52) U.S. Cl. ......... 422/502; 422/500; 422/501; 436/180

(58) Field of Classification Search .................. 422/128, 422/129
See application file for complete search history.

(56) References Cited

U.S. PATENT DOCUMENTS

| | | | |
|---|---|---|---|
| 3,424,437 A | 1/1969 | Shearer | |
| 3,860,217 A | 1/1975 | Grout | |
| 5,061,544 A | 10/1991 | Wada et al. | |
| 5,087,330 A | 2/1992 | Wada et al. | |
| 5,783,129 A | 7/1998 | Shirai et al. | |
| 5,938,333 A | 8/1999 | Kearney | |
| 6,082,891 A | 7/2000 | Schubert et al. | |
| 6,186,660 B1 | 2/2001 | Kopf-Sill et al. | |
| 6,245,249 B1 | 6/2001 | Yamada et al. | |
| 6,355,173 B1 | 3/2002 | Den Bieman et al. | |
| 6,361,824 B1 | 3/2002 | Yekimov et al. | |
| 6,368,871 B1 | 4/2002 | Christel et al. | |
| 6,616,327 B1 | 9/2003 | Kearney et al. | |
| 6,818,394 B1 | 11/2004 | O'Donnell-Maloney et al. | |
| 7,449,159 B2 | 11/2008 | Nomura et al. | |
| 8,147,121 B2 | 4/2012 | Lacy et al. | |
| 2002/0058332 A1 | 5/2002 | Quake et al. | |
| 2003/0008308 A1 | 1/2003 | Enzelberger et al. | |
| 2004/0213083 A1 | 10/2004 | Fujiwara et al. | |
| 2005/0163701 A1 | 7/2005 | Tonkovich et al. | |
| 2005/0167354 A1 | 8/2005 | Caze et al. | |
| 2005/0207952 A1 | 9/2005 | Mae | |
| 2005/0207953 A1 | 9/2005 | Upadhye et al. | |

(Continued)

FOREIGN PATENT DOCUMENTS
EP    1 481 724 A1    12/2004
(Continued)

OTHER PUBLICATIONS

Miyashita et al.; "Sonic Crystal Waveguide—Numerical Simulations and Experiments;" *Technical Report of the Institute of Electronics, Information and Communication Engineers*; Jun. 2001; pp. 33-39. (with abstract).

(Continued)

*Primary Examiner* — Kevin Joyner
(74) *Attorney, Agent, or Firm* — Oliff & Berridge, PLC

(57) ABSTRACT

A microreactor device comprises: a microchannel that sends one or more fluids; and a section that isolates vibrations to a first portion of the microchannel.

9 Claims, 11 Drawing Sheets

U.S. PATENT DOCUMENTS

| | | | |
|---|---|---|---|
| 2006/0073080 A1 | 4/2006 | Tonkovich et al. | |
| 2006/0140829 A1* | 6/2006 | Tabata et al. | 422/198 |
| 2006/0159601 A1* | 7/2006 | Yamada et al. | 422/198 |
| 2006/0272722 A1 | 12/2006 | Yamada et al. | |
| 2007/0062856 A1 | 3/2007 | Pahl et al. | |
| 2007/0139451 A1 | 6/2007 | Somasiri et al. | |
| 2007/0183933 A1* | 8/2007 | Kawazoe et al. | 422/99 |
| 2007/0256736 A1 | 11/2007 | Tonkovich et al. | |
| 2007/0286795 A1 | 12/2007 | Chiba et al. | |
| 2008/0226517 A1 | 9/2008 | Vitucci et al. | |
| 2008/0245745 A1* | 10/2008 | Ward et al. | 210/748 |
| 2009/0130025 A1 | 5/2009 | Bohmer et al. | |
| 2010/0008179 A1 | 1/2010 | Lacy et al. | |
| 2010/0068366 A1 | 3/2010 | Tonkovich et al. | |

FOREIGN PATENT DOCUMENTS

| | | |
|---|---|---|
| EP | 1 577 000 A2 | 9/2005 |
| EP | 1 767 268 A1 | 3/2007 |
| JP | A-50-002256 | 1/1975 |
| JP | B-H06-37291 | 5/1994 |
| JP | A-09-512742 | 12/1997 |
| JP | A-10-305488 | 11/1998 |
| JP | A-10-512197 | 11/1998 |
| JP | A-2000-506432 | 5/2000 |
| JP | A-2000-238000 | 9/2000 |
| JP | A-2001-509728 | 7/2001 |
| JP | A-2002-527250 | 8/2002 |
| JP | A-2002-292274 | 10/2002 |
| JP | A-2003-194806 | 7/2003 |
| JP | A-2004-154648 | 6/2004 |
| JP | A-2004-223637 | 8/2004 |
| JP | A-2004-330008 | 11/2004 |
| JP | A-2004-344877 | 12/2004 |
| JP | A-2004-354180 | 12/2004 |
| JP | A-2004-358602 | 12/2004 |
| JP | A-2005-028267 | 2/2005 |
| JP | A-2005-072652 | 3/2005 |
| JP | A-2005-144634 | 6/2005 |
| JP | A-2005-152763 | 6/2005 |
| JP | A-2005-246294 | 9/2005 |
| JP | A-2005-262053 | 9/2005 |
| JP | A-2006-015254 | 1/2006 |
| JP | A-2006-061870 | 3/2006 |
| JP | A-2006-088077 | 4/2006 |
| JP | A-2006-095515 | 4/2006 |
| JP | A-2006-150347 | 6/2006 |
| JP | A-2006-161717 | 6/2006 |
| JP | A-2006-167612 | 6/2006 |
| JP | A-2006-187684 | 7/2006 |
| JP | A-2006-187685 | 7/2006 |
| JP | A-2006-272231 | 10/2006 |
| JP | A-2006-272232 | 10/2006 |
| JP | A-2006-305505 | 11/2006 |
| JP | A-2006-341140 | 12/2006 |
| JP | A-2007-100072 | 4/2007 |
| JP | A-2007-105667 | 4/2007 |
| JP | A-2007-519510 | 7/2007 |
| JP | A-2007-252979 | 10/2007 |
| JP | A-2007-260678 | 10/2007 |
| JP | T-2008-514428 | 5/2008 |
| JP | A-2008-168173 | 7/2008 |
| WO | WO 95/30476 | 11/1995 |
| WO | WO 97/14497 | 4/1997 |
| WO | WO 00/22436 | 4/2000 |
| WO | WO 2006/039568 A1 | 4/2006 |
| WO | WO 2006/046202 A1 | 5/2006 |
| WO | WO 2006-087655 A1 | 8/2006 |

OTHER PUBLICATIONS

Mizukoshi et al.; "25th Lecture Summary of Surface Science Lecture Convention;" *The Surface Science Society Japan*; Nov. 14, 2005. (with translation).
Feb. 16, 2012 Office Action issued in U.S. Appl. No. 12/196,783.
Feb. 6, 2012 Office Action issued in U.S. Appl. No. 11/783,394.
Sep. 26, 2011 Office Action issued in Japanese Application No. 2007-275991 (with translation).
May 24, 2011 Office Action issued in Japanese Patent Application No. 2009-063109 (with translation).
Feb. 24, 2011 Office Action issued in Japanese Patent Application No. 2009-063109 (with translation).
Takei et al. "Sub-Nano Litter Micro Batch Operation Systems With Multi-Step Laplace Pressure Valves Prepared by Photocatalytic Analog Lithography", The 10th International Conference on Miniaturized Systems for Chemistry and Life Science, Nov. 5-9, 2006, pp. 245-247, Tokyo, Japan.
Hideo Yoshida; "Surface Tension", Proceedings of the TED-COF. '01, Journal Society of Mechanical Engineers, 2001, pp. 1-5.
Oct. 17, 2011 Office Action issued in U.S. Appl. No. 12/196,783.
Oct. 27, 2009 Office Action issued in U.S. Appl. No. 11/905,931.
Mar. 22, 2010 Office Action issued in U.S. Appl. No. 11/905,931.
May 11, 2011 Office Action issued in U.S. Appl. No. 11/905,931.
Sep. 16, 2011 Office Action issued in U.S. Appl. No. 11/905,931.
Xu Ji et al. "A Centrifugation-Enhanced High-Efficiency Micro-Filter with Spiral Channel", Transducers & Eurosensors '07, The 14th International Conference on Solid-State Sensors, Actuators and Microsystems, Lyon, France, Jun. 10-14, 2007, pp. 1865-1868.
Oct. 5, 2010 Office Action issued in Japanese Patent Application No. 2008-292428 (with translation).
Jan. 28, 2011 Office Action issued in U.S. Appl. No. 12/422,528.
May 17, 2011 Office Action issued in U.S. Appl. No. 12/422,528.
Nov. 30, 2010 Office Action issued in Japanese Patent Application No. 2006-195904 (with translation).
Aug. 20, 2009 Office Action issued in U.S. Appl. No. 11/783,394.
Jun. 8, 2010 Office Action issued in U.S. Appl. No. 11/783,394.
Mar. 25, 2011 Office Action issued in U.S. Appl. No. 11/783,394.
Oct. 13, 2011 Office Action issued in U.S. Appl. No. 11/783,394.
U.S. Appl. No. 12/196,783 in the name of Tabata et al., filed Aug. 22, 2008.
U.S. Appl. No. 12/575,136 in the name of Takahashi et al., filed Oct. 7, 2009.
U.S. Appl. No. 12/422,528 in the name of Hongo et al., filed Apr. 13, 2009.
U.S. Appl. No. 11/905,931 in the name of Yamada et al., filed Oct. 5, 2007.
U.S. Appl. No. 11/783,394 in the name of Tabata et al., filed Apr. 9, 2007.
Oct. 18, 2011 Office Action issued in Japanese Patent Application No. 2007-266414 (with translation).
Office Action issued May 22, 2012 in corresponding Japanese Application No. 2007-080768 with English translation.
Office Action issued Jul. 25, 2012 in related U.S. Appl. No. 11/783,394.
Jun. 4, 2012 Office Action issued in U.S. Appl. No. 11/905,931.
Sep. 20, 2012 Office Action issued in U.S. Appl. No. 12/575,136.

* cited by examiner

| ONE-DIMENSIONAL | TWO-DIMENSIONAL | THREE-DIMENSIONAL |
|---|---|---|
| FIG. 1A | FIG. 1C | FIG. 1E |
| 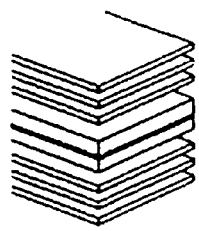 | 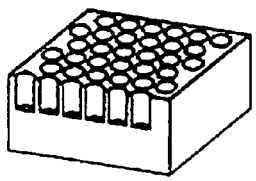 | 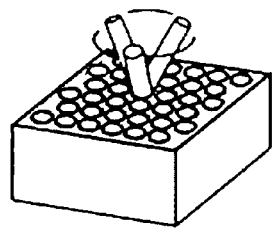 |
| (MULTILAYER FILMS) | (ROUND HOLE) | (YABLONOVITE) |
| FIG. 1B | FIG. 1D | FIG. 1F |
| 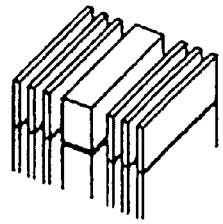 | 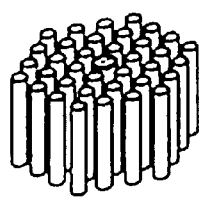 | 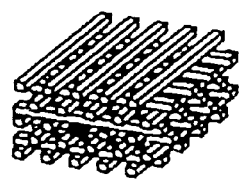 |
| (MULTILAYER FILMS) | (CYLINDER) | (WOODPILE) |

MICROREACTOR DEVICE

CROSS-REFERENCE TO RELATED APPLICATIONS

This application is based on and claims priority under 35 USC 119 from Japanese Patent Application No. 2007-266414 filed Oct. 12, 2007.

BACKGROUND

Technical Field

The present invention relates to a microreactor device (hereafter, the "microreactor device" will also be simply referred to as the "microreactor").

SUMMARY

According to an aspect of the invention, there is provided a microreactor device comprises: a microchannel that sends one or more fluids; and a section that isolates vibrations to a first portion of the microchannel.

BRIEF DESCRIPTION OF THE DRAWINGS

Exemplary embodiments of the present invention will be described in detail based on the following figure, wherein:

FIGS. 1A to 1F are diagrams illustrating examples of phononic crystal structures respectively having a one-dimensional crystal structure, a two-dimensional crystal structure, and a three-dimensional crystal structure;

DETAILED DESCRIPTION

Figure 2:
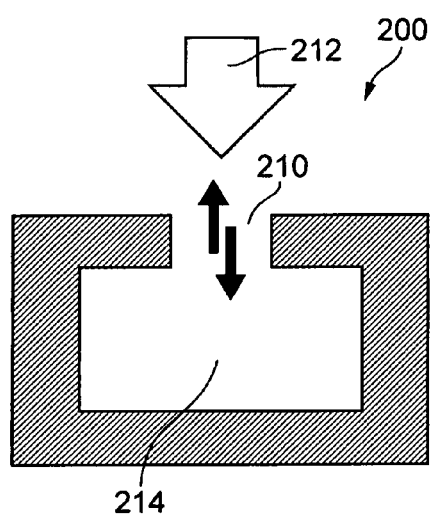
FIG. 2 is a conceptual diagram of a Helmholtz resonator 200.

The microreactor device in accordance with this exemplary embodiment is characterized in that it has a microchannel for allowing one or more fluids to flow therethrough and a section that isolates vibrations.

In a case where a stable laminar flow is formed in a microchannel, if vibrations are transmitted to a laminar flow field (here, the laminar flow field means a laminar-flow forming region in the microchannel), turbulence occurs in the laminar flow. As a result, in a case where two or more fluids are allowed to flow laminarly, turbulence occurs at the interface between the fluids. In addition, in a case where separation making use of sedimentation or the like is carried out while allowing a microparticle dispersion liquid to flow laminarly, turbulence occurs in the sedimentation since vibrations are transmitted. In this exemplary embodiment, the disturbance of the laminar flow does not occur since the transmission of these vibrations is cut off.

In case of using a solvent with a microreactor device, the promotion of a chemical reaction, the mixing of two or more fluids, and the like are also carried out by the formation of a turbulent flow field, the application of ultrasonic vibrations, and the like. In a solution reaction system using a microreactor device, the formation of a turbulence based on a baffle plate or an agitation plate is well known, but such a baffle plate or an agitation plate can cause clogging and increase a pressure loss. This becomes noticeable particularly in a system where particles are present in mixed form in a fluid. In contrast, in the application of such as ultrasonic vibrations or low-frequency vibrations, the clogging of a flow channel, an increase in the pressure loss, and the like can be avoided.

However, the application of vibrations vibrates the entire microreactor device. For this reason, in a case where a vibration area (here, the vibration area refers to an area where the application of vibrations to the fluid is desirable) and a vibration isolation area (here, the vibration isolation area refers to an area where the formation of a stable laminar flow by isolating the vibrations is desirable) are provided in the same microreactor device, the vibrations are transmitted to the vibration isolation area. Particularly in the case where the vibration area and the vibration isolation area are built up on the same microreactor chip, the laminar flow is disturbed in the vibration isolation area. In this exemplary embodiment, the disturbance of the laminar flow does not occur since the transmission of the vibrations to the vibration isolation area is cut off.

<Microchannel>

In this exemplary embodiment, the microchannel refers to a channel whose diameter is 5,000 μm or less. It should be noted that the channel diameter is a circular equivalent diameter which is determined from the cross-sectional area of the channel.

In this exemplary embodiment, a microreactor having a channel diameter of several micrometers to several thousand micrometers as the microchannel is preferably used. The channel diameter of the microchannel of the microreactor device is preferably 50 μm or more or about 50 μm or more and 1,000 μm or less or about 1,000 μm or less (it should be noted that "50 μm or more or about 50 μm or more and 1,000 μm or less or about 1,000 μm or less" will also be described as "50 μm or about 50 μm to 1,000 μm or about 1,000 μm" or "50 or about 50 to 1,000 or about 1,000 μm, hereinafter the same") and is more preferably 50 or about 50 to 500 or about 500 μm. The microreactor device used in this exemplary embodiment is a reactor having a plurality of channels of a micro scale. Since the channel of the microreactor is on a microscale, the size and the flow rate are both small, and the Reynolds number is 2,300 or less or about 2,300 or less. Accordingly, the reactor having microchannels is not a turbulent flow-dominant device as in a regular reactor but a laminar flow-dominant device unless the application of vibrations, the formation of a baffle plate or an agitation plate, or the like is carried out.

Here, the Reynolds number (Re) is defined by the following formula, the laminar flow is dominant when the Reynolds number is 2,300 or less.

$$Re=uL/v$$

(u: velocity of flow, L: representative length, v: coefficient of kinetic viscosity)

It should be noted that the cross-sectional shape of the microchannel is not particularly limited, and can be appropriately selected from among a circular shape, an elliptical shape, a rectangular shape, a potbellied shape, and the like depending on the objective. Among these, the cross-sectional shape of the microchannel is more preferably a circular shape or a rectangular shape, and the rectangular shape is even more preferable. From the manufacturer's point of the view, the microchannel should preferably be rectangular in its cross-sectional shape.

<Section that Isolates Vibrations>

The microreactor device in accordance with this exemplary embodiment has a section that isolates vibrations. The term "vibrations" is meant to broadly include vibrations of such as ultrasonic waves, sound waves, low-frequency waves and is not particularly limited. In addition, the pulsation of a fluid and vibrations generated by an apparatus which generates them also correspond to the "vibrations." Among these, the section that isolates vibrations in this exemplary embodiment is preferably a section that isolates sonic vibrations and ultrasonic vibrations. So, the section that isolates vibrations is preferably a section which isolates vibrations whose frequency is from 1 Hz to 10 MHz.

The section that isolates vibrations is not particularly limited insofar as it is a section which is capable of isolating vibrations caused outside and/or inside the microreactor device, and may preferably be selected according to the objective and the kind (frequency and the like) of vibrations generated.

Among them, the section that isolates vibrations is preferably at least one selected from the group consisting of a phononic crystal structure, a Helmholtz type resonator, a vacuum layer, and a vibration proof rubber.

[Phononic Crystal Structure]

A photonic crystal is known which is a nonconductor of light, which completely shields the light of a specific wavelength due to a band gap with respect to light (photonic band gap). Such a crystal structure is also applicable to a sonic range, and is called a phononic crystal structure particularly in a case where it is used as a crystal capable of isolating a sonic range. The phononic crystal structure is capable of isolating vibrations by merely adopting a periodic structure equivalent to the wavelength of the vibration subject to isolation, and has high wavelength selectivity, so that the phononic crystal structure is preferable.

The phononic crystal structure can be constructed as a (1) a one-dimensional crystal structure, a two-dimensional crystal structure, or a three-dimensional crystal structure. FIGS. 1A to 1F are diagrams illustrating examples of the phononic crystal structures respectively having a one-dimensional crystal structure, a two-dimensional crystal structure, and a three-dimensional crystal structure.

As the one-dimensional crystal structure, it is possible to cite periodic structures of multilayer films, as shown in FIGS. 1A and 1B. By setting the period equal to a half wavelength of the vibration, a reflection is produced to thereby make it possible to cut off the transmission of the vibration.

As the two-dimensional crystal structure, it is possible to cite a structure in which recesses are provided in a triangular or square lattice in a thin plate (FIG. 1C). Further, it is also possible to cite a form in which, conversely, cylinders are arrayed in a triangular lattice (FIG. 1D).

As the three-dimensional crystal structure, it is possible to cite by way of example a Yablonovite structure (FIG. 1E) and a woodpile structure (FIG. 1F). In addition to these, it is possible to adopt three-dimensional crystal structures described in Fan, et al., Applied Physics Letters, vol. 65, pp. 1465-1468, 1994 and in S. G. Johnson and J. D Joannopoulos, Applied Physics Letters, vol. 77, pp. 3490-3492, 2000.

Among them, it is possible to use those in which the direction of propagation of the vibration is either the vertical direction or the horizontal direction of the periodic structure of the crystal, and it is possible to effectively cut off the transmission of the vibration. Therefore, the phononic crystal structure should preferably be a three-dimensional crystal structure, and in light of the ease of fabrication of the phononic crystal structure the phononic crystal structure should more preferably be a woodpile structure.

In cases where vibrations are isolated by the phononic crystal structure, the frequency of the intended vibration is preferably 10 kHz or greater, more preferably 10 kHz to 10 MHz. If the frequency of the vibration is within the aforementioned range, the wavelength of the sound in air at normal temperature and pressure becomes 3,400 to 34 μm. In the phononic crystal structure, a half wavelength of this wavelength needs to be set to the period of the phononic crystal structure. If the frequency is within the aforementioned range, this setting is suitable for the formation of the periodic structure of the phononic crystal structure, and is therefore preferable. Accordingly, the phononic crystal exhibits a high effect in the case where the frequency range of the vibration is narrow, and can be used particularly suitably as the section that isolates vibrations.

[Helmholtz Type Resonator]

In this exemplary embodiment, it is possible to use a Helmholtz type resonator as the section that isolates vibrations. The Helmholtz type resonator makes use of the principle of sound absorption of a Helmholtz resonator.

FIG. 2 is a conceptual diagram of a Helmholtz resonator 200. As shown in FIG. 2, when a vibration (sound wave or the like) 212 enters a cavity portion 214 through a hole 210, air in the cavity portion 214 acts as a spring, and the air in the hole 210 vibrates vehemently, whereby a large sound absorption effect is conceivably produced by a frictional loss at a resonance frequency based on the masses of air in the cavity portion 213 and in the hole 210. Consequently, the vibration can conceivably be confined within the resonator (cavity portion), thereby making it possible to isolate the vibration (suppress the propagation of the vibration)

The Helmholtz type resonator is preferred since its structure is simple and an application to the microreactor is easy. Also, depending on the position of a vibration source, only a specific frequency can be cut off by using the Helmholtz type resonator, which is desirable.

In light of its principle, the Helmholtz type resonator is preferably disposed perpendicularly to the vibration source or the direction of propagation of the vibration, whereby it is possible to effectively isolate the vibrations.

In the case where the Helmholtz type resonator is used as the section that isolates vibrations, the frequency of the vibration to be isolated is preferably 100 Hz to 100 kHz, more preferably 0.1 kHz to 10 kHz. If the frequency of the vibration is within the aforementioned range, this setting is suitable to the isolation of vibrations by the Helmholtz type resonator, and is therefore preferable.

[Vacuum Layer]

In this exemplary embodiment, it is also preferable to use a vacuum layer as the section that isolates vibrations. The vacuum layer is capable of absorbing a wide frequency range of vibration, can be used as the section that isolates vibrations with respect to vibrations having a wide frequency range, and is therefore preferable. In addition, if the material is capable of vacuum sealing, it is possible to select from a wide range of materials, and the degree of freedom in design is large, so that such a material is preferable. Further, the vacuum layer has a thermal insulation effect and also has a function of cutting off the transmission of heat.

In the case where the vacuum layer is used as the section that isolates vibrations, the frequency of the vibration to be isolated is preferably 10 Hz to 1 MHz or about 10 Hz to about 1 MHz, more preferably 100 Hz to 10 kHz or about 100 Hz to about 10 kHz. The vacuum layer is most effective to use in a case where the range of frequency of vibration is large.

[Vibration Proof Rubber]

In this exemplary embodiment, it is also preferable to use a vibration proof rubber as the section that isolates vibrations. It should be noted that the term "vibration proof rubber" broadly means a resin which has the functions of vibration isolation, vibration control, and the like. Among them, it is preferable to use an elastic rubber as the vibration proof rubber. The term "elastic rubber" broadly means a resin which exhibits the properties of an elastic material.

As the elastic rubber, rubber or a thermoplastic elastomer is used.

As the aforementioned rubber, it is possible to use natural rubber, isoprene rubber, butadiene rubber, butyl rubber, nitrile rubber, acrylic rubber, chloroprene rubber, styrene-butadiene copolymer rubber (SBR), ethylene-propylene copolymer rubber (EPR, EPDM), polyisobutylene, silicone rubber, polysulfide rubber, norbornene rubber, urethane rubber, and the like. These rubbers are preferably used in unvulcanized form, but it is also possible to use precrosslinked rubber which has been partially crosslinked.

As the thermoplastic elastomer, it is possible to use a styrene-butadiene-styrene block copolymer (SBS), a styrene-isoprene-styrene block copolymer (SIS), and the like.

As for the aforementioned elastic rubber, it is possible to use one kind or a mixture of two or more kinds, and the rubber and a thermoplastic elastomer may be blended for use.

In addition, the vibration proof rubber may be constituted by an elastic rubber composition in which a filler, a reinforcing agent, a softener, a binder, a rust preventive agent, a lubricant, a processing aid, an antioxidant, flame retardant, and/or the like are compounded in the aforementioned elastic rubber.

Among these, chloroprene rubber and silicone rubber can be preferably cited as the vibration proof rubber. Further, a plurality of such kinds may be preferably used by being formed into a compound material.

In the case where the vibration proof rubber is used as the section that isolates vibrations, it is preferable to select its material, thickness, and the like in correspondence with the frequency of the vibration to be isolated. In the case where the vibration proof rubber is used, the frequency of vibration to be isolated is preferably 1 Hz to 100 Hz or about 1 Hz to about 100 Hz, more preferably 5 Hz to 40 Hz or about 5 Hz to about 40 Hz. Cases where the frequency of the vibration is a low frequency as in the aforementioned range are preferable.

In this exemplary embodiment, the section that isolates vibrations is not limited to the above-described section. For example, it is possible to isolate a wide range of vibration by fabricating phononic crystals from a vibration proof rubber material, or it is also possible to suppress vibrations by forming an active vibration-free system in which a sensor and an actuator are provided to apply vibrations at the same frequency as an excitation frequency and in an opposite phase.

In this exemplary embodiment, as the section that isolates vibrations, one kind can be used independently, or two or more sections may be used in combination. In addition, it is preferable to appropriately select the section that isolates vibrations in correspondence with the kind, e.g., frequency, of the vibration generated.

Furthermore, it suffices if the section that isolates vibrations is provided at one or more locations on the microreactor device, and it is also preferable to provide the section that isolates vibrations at a plurality of locations such as on vertically and horizontally both sides surrounding the microchannel subject to vibration isolation.

<Section that Generates Vibrations>

In this exemplary embodiment, the microreactor should preferably have a section that generates vibrations. As the section that generates vibrations and the section that isolates vibrations are provided, it is possible to form the vibration area and the vibration isolation area in one microreactor, so that this arrangement is preferable.

The section that generates vibrations should preferably generate vibrations with a frequency of 1 Hz to 10 MHz or about 1 Hz to about 10 MHz, more preferably generate vibrations with a frequency of 1 Hz to 10 kHz or about 1 Hz to about 10 kHz, and even more preferably generate vibrations with a frequency of 1 Hz to 100 Hz or about 1 Hz to about 100 Hz.

The section that generates vibrations is not particularly limited and is sufficient if it is a section capable of imparting vibrations to the fluid which is sent through the microchannel, and the section that generates vibrations can be selected appropriately.

Specifically, it is possible to cite, among others, a section in which a mechanical diaphragm is disposed outside the channel to impart vibrations to the microchannel, a section in which an ultrasonic vibration source is disposed to impart ultrasonic vibrations, a section in which a rotor or an agitator is disposed in the flow channel to generate vibrations by a force from the outside, and a section in which a piezoelectric vibrator is caused to generate predetermined frequency vibrations by the application of a voltage.

Figure 3A:
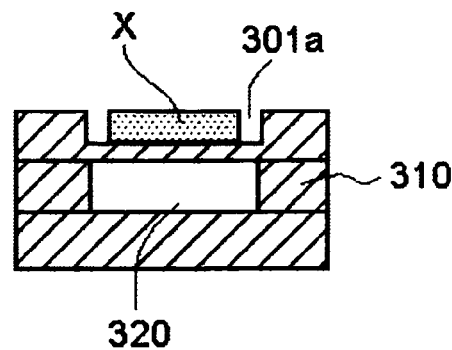
FIGS. 3A to 3C are conceptual diagrams of microchannels and illustrate states in which a vibrator is disposed.
Figure 3B:
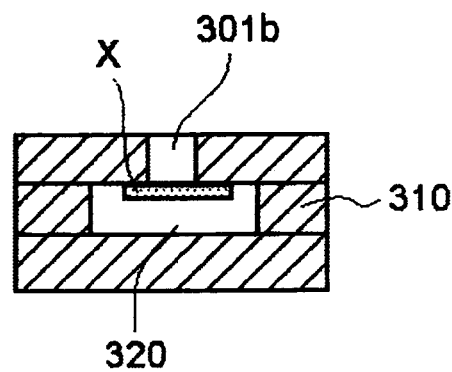
Figure 3C:
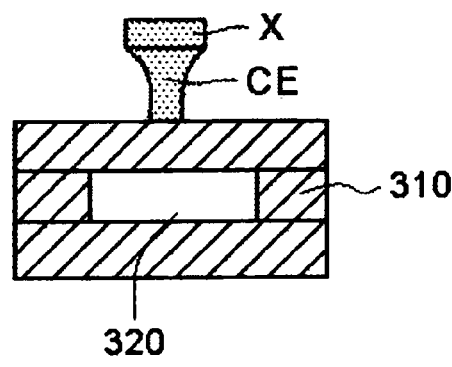

A detailed description will be given of the section that generates vibrations by using a vibrator. FIGS. 3A to 3C are conceptual diagrams of microchannels and illustrate states in which a vibrator is disposed.

FIG. 3A is a cross-sectional view illustrating the state of disposition in a case where a piezoelectric element formed of lead-zirconate-titanate (PZT, composition formula: Pb(Zr, Ti)$O_3$) or the like is used as a vibrator X. In a portion above a microchannel 320 formed in a substrate 310, a recessed portion 301a is formed at a position opposing an inner surface of the microchannel 320. The vibrator X is disposed in this recessed portion 301a. Electric power for driving the vibrator X is supplied by, for example, a wiring, and the vibrator and the wiring are connected by wire bonding, for instance.

The portion where the vibrator is disposed vibrates due to vibrations from the vibrator, and these vibrations are transmitted to the fluid flowing through the microchannel. As a result, turbulence is produced in the fluid. For example, by disposing the vibrator at a confluent channel (channel where two or more kinds of fluids are sent), a turbulent flow is formed to mix the fluids. In addition, turbulence is produced between interfaces by the vibrations to promote the diffusion of the fluids. It should be noted that as the vibrator is disposed in the recessed portion, the vibrator is disposed in a portion whose thickness is smaller than its surroundings, so that the portion where the vibrator is disposed can be reliably vibrated, and the fluids can be vibrated efficiently.

FIG. 3B is a cross-sectional view illustrating the state of disposition in a case where a crystal oscillator is used as the vibrator X. In a portion above the microchannel 320, a through hole 301b, which is an elongated hole extending along a flowing direction (a perpendicular direction to the plane of the drawing of FIG. 3B) of the channel, is formed at a position constituting an inner surface of the channel. The vibrator X is disposed in this recessed portion 301a. Electric power for driving the vibrator X is supplied by, for example, a wiring, and the vibrator and the wiring are connected by wire bonding, for instance. The vibrator X is disposed by being attached to the inner surface of the channel in such a manner as to cover the through hole 301b. Electric power for driving the vibrator X is supplied by a wiring which is formed from an outer surface of the substrate 310 to extend along an inner surface of the through hole 301b and is connected to the vibrator X. Vibrations from the vibrator X are directly transmitted to the fluid flowing through the microchannel 320.

FIG. 3C is a cross-sectional view illustrating the state of disposition in a case where an ultrasonic transducer is used as the vibrator X. The ultrasonic transducer X is mounted on a large-diameter side end portion of a cone (a cylindrical member whose outer shape is a substantially conical shape) CE. The cone CE with the ultrasonic transducer mounted thereon has its small-diameter side end portion affixed to an outer surface of the substrate 310 at a position opposing the inner surface of the channel portion. Electric power for driving the ultrasonic transducer X is supplied by a wiring which is formed on an outer surface of the substrate 310 and is connected to the ultrasonic transducer X. Vibrations from the ultrasonic transducer X are transmitted via the cone CE and the substrate 310 to the fluid flowing through the microchannel 320.

It should be noted that the section that generates vibrations is not limited to the above-described ones.

A distal end of a fiber probe fabricated by making an optical fiber sharp-pointed may be disposed in a flow channel so as to be in direct contact with a fluid, and vibrations may be applied to this fiber probe from outside the channel by, for example, a PZT, so as to produce vibrations in the fluid. This is described in detail in, for example, JP-A-2006-205080.

Also, JP-A-2001-252897 discloses a microreactor in which an optical mixer, which rotates by using as a driving force optical pressure generated by light irradiation, is disposed in a mixing portion for mixing a sample liquid and a reagent solution in a micro analytical chip. The microreactor is thus disclosed in which the optical mixer irradiated by laser light or the like rotates in the mixing portion to induce convection in the sample liquid and the reagent solution, thereby actively and directly mixing and agitating the two liquids. This optical mixer can be used as the section that generates vibrations.

In addition to these, as the section that generates vibrations it is also possible to cite by way of example a vibrating motor (vibrator) and an electro-osmotic flow (in a case where the fluid is an electrolyte) based on an ac field.

As the section that isolates vibrations is provided with respect to the vibrations occurring in the microreactor by such rotation and vibration, a laminar flow field is formed in the same microreactor.

Among them, the section that generates vibrations is preferably one which uses a vibrator. Specifically, the section that generates vibrations is more preferably a section that generates vibrations by at least one vibrator selected from the group consisting of a piezoelectric element, a crystal oscillator, and an ultrasonic transducer. Further, it is preferable to use an ultrasonic transducer in this exemplary embodiment.

In this exemplary embodiment the kind of vibration to be applied is not particularly limited, and can be appropriately selected according to a desired objective. Among these, it is preferable to use an ultrasonic wave with a frequency of 100 kHz to 10 MHz or about 100 kHz to about 10 MHz, and it is more preferable to use an ultrasonic wave with a frequency of 100 kHz to 10 MHz or about 100 kHz to about 10 MHz. By applying vibrations of such a frequency, the mixing of the fluids is promoted, so that it is favorable.

<Manufacture of Microreactor Device>

The method of manufacturing a microreactor device in accordance with this exemplary embodiment is not particularly limited, and the microreactor device may be fabricated by any known method.

The microreactor device in accordance with this exemplary embodiment can also be fabricated on a solid substrate by a micro-machining technique.

As examples of materials which can be used as the solid substrate, it is possible to cite a metal, silicon, Teflon (registered tradename), glass, a ceramic, a plastic, and the like. Among others, a metal, silicon, Teflon (registered tradename), glass, and a ceramic are preferable from the standpoint of heat resistance, withstand pressure, chemical-proof property, and optical transparency, and glass is particularly preferable.

As the micro-machining techniques for fabricating the channels, it is possible to cite the methods described in, for example, "Microreactors, Epoch-making Technology for Synthesis" (edited by Jun-ichi Yoshida and published by CMC Publishing Co., Ltd., 2003) and "Fine Processing Technology, Application Volume—Application to Photonics, Electronics and Mechatronics—" (edited by the Meeting Committee of the Society of Polymer Science, Japan, and published by NTS Inc., 2003).

To cite typical methods, the micro-machining techniques include, for instance, the LIGA (lithographic galvano forming ab forming) technique using X-ray lithography, high-aspect-ratio photolithography using EPON SU-8 (tradename), micro-electro-discharge machining (μ-EDM), high-aspect-ratio machining of silicon by deep reactive ion etching (RIE), hot embossing, stereolithography, laser machining, ion beam machining, and mechanical micro-cutting using micro-tools made of hard materials such as diamond. Any of these techniques can either be used by itself or in a combination of two or more. More preferable ones among these micro-machining techniques are the LIGA (lithographic galvanoforming ab forming) technique using X-ray lithography, high-aspect-ratio photolithography using EPON SU-8, micro-electro-discharge machining (μ-EDM), and mechanical micro-cutting.

The flow channels used in this exemplary embodiment can also be fabricated by pouring and solidifying a resin in a pattern, as a mold, formed on a silicon wafer by using a photoresist (molding process). As the molding process, it is possible to use a silicone resin which is typified by polydimethylsiloxane (PDMS) or its derivative.

In manufacturing the microreactor device in accordance with this exemplary embodiment, it is possible to use a bonding technique. Normal bonding techniques are classified into solid phase bonding and liquid phase bonding. As bonding methods which are generally employed, pressure bonding and diffusion bonding can be cited as typical methods of solid phase bonding, while welding, soldering, adhesive bonding, and the like can be cited as typical methods of liquid phase bonding.

Furthermore, the bonding method should preferably be highly accurate in such a manner as to keep high precision without changing the properties of the material due to application of high-temperature heat thereto and without changing the shape of microstructures, such as the flow channel, due to deformation thereof. As technologies for achieving such a bonding method, it is possible to cite silicon direct bonding, anodic bonding, surface activation bonding, direct bonding using a hydrogen bond, bonding using an HF aqueous solution, Au—Si eutectic bonding, and void-free bonding.

The microreactor device in accordance with this exemplary embodiment should preferably be formed by laminating pattern members (In particular, thin-film pattern members) of arbitrary shape. It should be noted that the thickness of the pattern member is preferably 5 to 50 µm or about 5 to about 50 µm, more preferably 10 to 30 µm or about 10 to about 30 µm.

The microreactor device in accordance with this exemplary embodiment should preferably be a microreactor device formed by laminating pattern members each having a predetermined two-dimensional pattern formed thereon, and should more preferably be such that the pattern members are laminated with their surfaces bonded in direct contact with each other.

As a preferred method of manufacturing a microreactor device in accordance with this exemplary embodiment, it is possible to cite by way of example a method of manufacturing a microreactor device, comprising:

(i) the step (donor substrate fabrication step) of forming on a first substrate a plurality of pattern members corresponding to respective cross-sectional shapes of an intended microreactor device; and (ii) the step (bonding step) of transferring the plurality of pattern members on the first substrate onto a second substrate by repeating the bonding and spacing-apart of the first substrate with the plurality of pattern members formed thereon and the second substrate. The manufacturing method disclosed in JP-A-2006-187684, for example, can be referred to.

A more detailed description will be given of the method of manufacturing a microreactor device in accordance with this exemplary embodiment.

[Step of Fabricating a Donor Substrate]

In this exemplary embodiment, the donor substrate should preferably be formed by using electroforming. Here, the donor substrate is a substrate in which a plurality of pattern members corresponding to respective cross-sectional shapes of an intended microreactor device are formed on a first substrate. The first substrate is preferably formed of a metal, a ceramic, or silicon, and a metal such as stainless steel can be suitably used.

First, a first substrate is prepared. A thick-film photoresist is applied to the first substrate and is subjected to exposure by using photomasks corresponding to the respective cross-sectional shapes of the microreactor device to be fabricated, and the photoresist is subjected to development to form a resist pattern in which the cross-sectional shapes are positive/negative inverted. Next, the substrate having this resist pattern is immersed in a plating bath, and nickel plating, for instance, is allowed to grow on the surface of the metal substrate which is not covered by the photoresist. The pattern members are preferably formed by copper or nickel by using electroforming.

Next, the resist pattern is removed, and pattern members corresponding to the respective cross-sectional shapes of the microreactor device are thereby formed on the first substrate.

[Bonding Step]

The bonding step is a step in which the plurality of pattern members on the first substrate (donor substrate) are transferred onto a second substrate (target substrate) by repeating the bonding and spacing-apart of the donor substrate with the plurality of pattern members formed thereon and the target substrate. Bonding is preferably carried out by normal-temperature bonding or surface activation bonding.

FIGS. 4A to 4F are manufacturing process diagrams illustrating an exemplary embodiment of the method of manufacturing a microreactor device which can be suitably used in this exemplary embodiment.

Figure 4A:
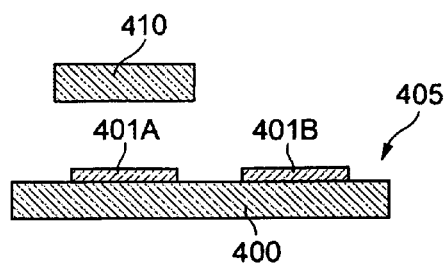
FIGS. 4A to 4F are manufacturing process diagrams illustrating an exemplary embodiment of the method of manufacturing a microreactor device which can be suitably used in this exemplary embodiment.

Next, as shown in FIG. 4A, a donor substrate 405 described above is placed on an unillustrated lower stage within a vacuum tank, and a target substrate 410 is disposed on an unillustrated upper stage within the vacuum tank. Subsequently, the interior of the vacuum tank is evacuated so as to be set in a high vacuum state or an ultra-high vacuum state. Next, the lower stage is relatively moved with respect to the upper stage so as to position a first-layer pattern member 401A of the donor substrate 405 immediately below the target substrate 410. Then, the surface of the target substrate 410 and the surface of the first-layer pattern member 401A are irradiated with an argon atom beam and are thereby cleansed.

Figure 4D:
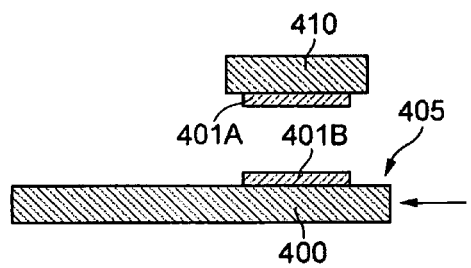
Figure 4B:
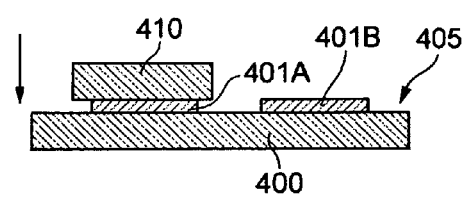

Next, as shown in FIG. 4B, the upper stage is lowered to press the target substrate 410 and the donor substrate 405 with a predetermined load force (e.g., 10 kgf/cm$^2$) for a predetermined time duration (e.g., 5 min.), thereby allowing the target substrate 410 and the first-layer pattern member 401A to normal-temperature bonding (surface activation bonding). In this exemplary embodiment, lamination is performed in the order of the pattern members 401A, 401B, . . . .

Figure 4E:
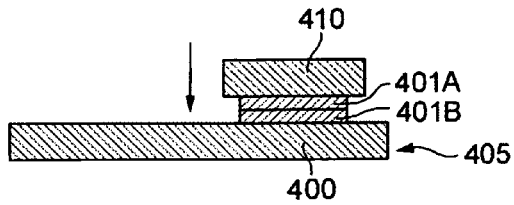
Figure 4C:
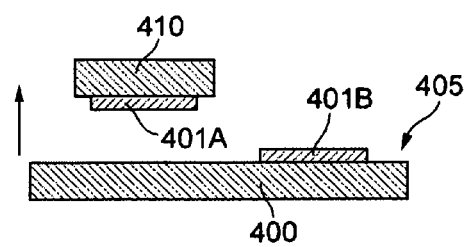

Next, if, as shown in FIG. 4C, the upper stage is raised to space apart the donor substrate and the target substrate, the first-layer pattern member 401A is exfoliated from a metal substrate (first substrate) 400 and is transferred onto the target substrate 410 side. This is because the adhesive force between the pattern member 401A and the target substrate 410 is greater than the adhesive force between the pattern member 401A and the metal substrate (first substrate) 400.

Next, as shown in FIG. 4D, the lower stage is moved to allow the second-layer pattern member 401B on the donor substrate 405 to be positioned immediately below the target substrate 410. Then, the surface (the surface which was in contact with the metal substrate 400) of the pattern member 401A transferred onto the target substrate 410 side and the surface of the second-layer pattern member 401B are subjected to cleansing, as described above.

Figure 4F:
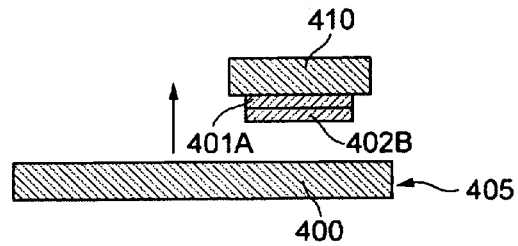

Next, if the upper stage is lowered to bond the first-layer pattern member 401A and the second-layer pattern member 401B, as shown in FIG. 4E, and the upper stage is raised, as shown in FIG. 4F, the second-layer pattern member 401B is exfoliated from the metal substrate (first substrate) 400, and is transferred onto the target substrate 410 side.

As for the other pattern members as well, as the positioning, bonding, and spacing-apart of the donor substrate 405 and the target substrate 410 are repeated, the plurality of pattern members corresponding to the respective cross-sectional shapes of the microreactor device are similarly transferred onto the target substrate. If the laminate transferred onto the target substrate 410 is detached from the upper stage, and the target substrate 410 is removed, a microreactor device can be obtained.

Although in the above-described exemplary embodiments the donor substrate is fabricated by using electroforming, the donor substrate may be fabricated by using a semiconductor process. For example, a substrate constituted by an Si wafer is prepared, and a release layer formed of a polyimide is deposited on this substrate by a spin coating process. An Al thin film serving as a constituent material of the microreactor device is deposited on the surface of this release layer by a sputtering process, and the Al thin film is subjected to patterning by a photolithographic process, thereby also making it possible to fabricate a donor substrate.

It should be noted that, in this exemplary embodiment, if the section that isolates vibrations and the section that generates vibrations are formed in advance on the pattern members prior to bonding, the microreactor device in accordance with this exemplary embodiment can be manufactured by using the above-described manufacturing method. In addition, in a case where the section that generates vibrations is formed on an uppermost layer, the processing can be provided after the bonding step.

In addition, in this exemplary embodiment, the section that isolates vibrations is preferably manufactured by laminating the pattern members. The phononic crystal structure and the Helmholtz type resonator, in particular, are suitable therefore.

Specifically, among the phononic crystal structures, the woodpile structure is preferable. As a method of fabricating a woodpile structure by the above-described lamination method, it is possible to suitably use the method described in JP-A-2007-003810. The woodpile structure can be formed by alternately laminating x-direction stripe patterns each having x-direction stripes extending in an x direction as well as y-direction stripe patterns each having y-direction stripes extending in a y direction.

The microreactor device of this exemplary embodiment can be applied to any device for effecting the formation of a stable laminar flow. For example, the microreactor device of this exemplary embodiment is suitable as a device which effects the formation of a stable laminar flow for performing separation or condensation, or as a device which effects accurate microanalysis or chemical reaction making use of diffusion.

Furthermore, the microreactor device of this exemplary embodiment is suitable as a microreactor device which effects such as the promotion of diffusion, mixture, and agitation of fluids in the vibration area and such as the separation, condensation, processing, and reaction in the laminar flow field. Namely, the microreactor device of this exemplary embodiment is suitable as a microreactor device in which the microchannel has two or more inlet ports for introducing two or more kinds of fluids and a confluent channel for sending the fluids by allowing the fluids to converge, and in which the section that generates vibrations generates vibrations to the confluent channel. By forming such a microreactor device, one microreactor device can be used in various applications making use of the vibration area and the vibration isolation area.

EXAMPLES

Hereafter, a more detailed description will be given of this exemplary embodiment with reference to the drawings. However, this exemplary embodiment is not limited to these examples.

Example 1

Synthesis of Iron Oxide Magnetic Nanoparticles (Barium Ferrite)

<Synthesis Procedure>
Preparation of Aqueous Solution A
An aqueous solution A containing 12.5 wt % NaOH and 3.15 wt % $Na_2CO_3$ was prepared.
Preparation of Aqueous Solution B
An aqueous solution B containing 20.5 wt % $FeCl_3.6H_2O$ and 167 wt % $BaCl_2.H_2O$ was prepared.

The aqueous solution A and the aqueous solution B were respectively sent from two inlet ports of the microreactor having a Y-shaped microchannel at a ratio of aqueous solution A: aqueous solution B=2:1 (vol/vol). Ultrasonic agitation was effected at a confluent channel to mix the two solutions.

Next, the solution mixture was sent through a section in which vibrations were shielded (separation channel). Consequently, $BaO.6Fe_2O_3$ produced by the aforementioned reaction was precipitated.

The solution mixture was separated into two upper and lower layers, distilled water (60° C.) was added to the lower layer liquid containing $BaO.6Fe_2O_3$ from another inlet port provided in the channel, and ultrasonic agitation was performed.

Next, the solution mixture was sent through a section where the vibrations were shielded (separation channel). Consequently, $BaO.6Fe_2O_3$ was precipitated again. The solution mixture was separated into two upper and lower layers, and a lower layer solution containing $BaO.6Fe_2O_3$ and a supernatant solution (upper layer solution) were obtained.

The pH of the upper layer solution was measured, and cleansing was performed by repeating the addition of distilled water, agitation, and separation until the measurement reached pH 7.0±0.5.

In addition, in the case where the pH of the upper layer solution was pH 7.0±0.5, the obtained sediment of the lower layer solution was subjected to suction and filtration to obtain $BaO.6Fe_2O_3$.

Figure 5:
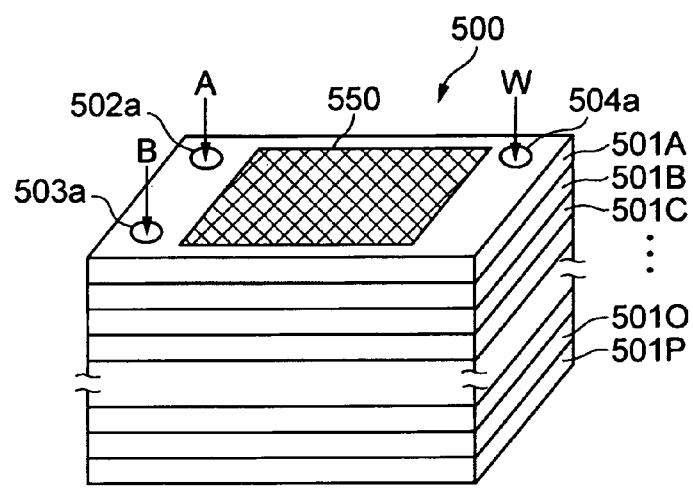
FIG. 5 is a conceptual diagram of the microreactor device used in one form of this exemplary embodiment.
Figure 6:
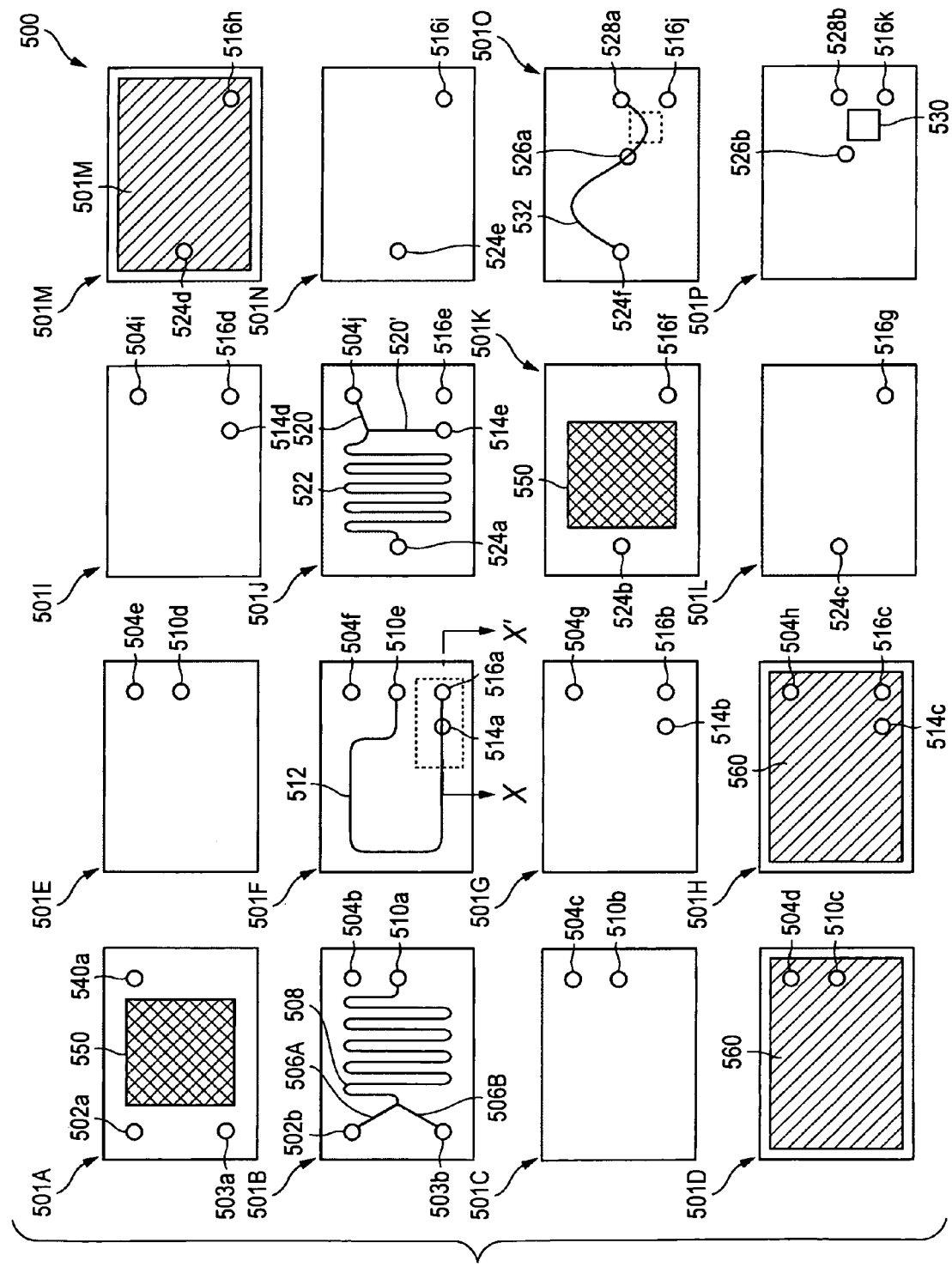
FIG. 6 is a plan view of each layer of the microreactor device used in the one form of this exemplary embodiment.
Figure 7:
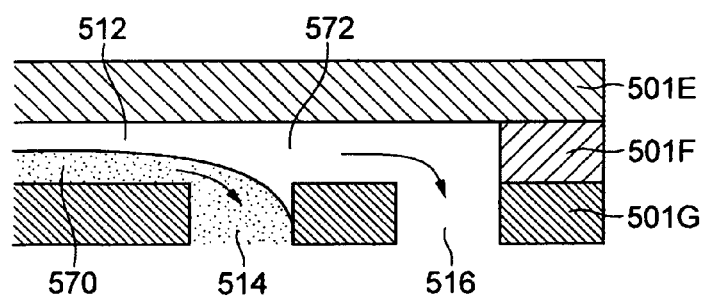
FIG. 7 is a cross-sectional view, taken along line X-X', of a layer 501E to a layer 501E of the microreactor device used in the one form of this exemplary embodiment.

FIGS. 5 to 7 are conceptual diagrams of the microreactor device used in Example 1.

Hereafter, a detailed description will be given of the above-described manufacturing method with reference to the drawings.

FIG. 5 is a conceptual diagram of the microreactor device used in one form of this exemplary embodiment. FIG. 6 is a plan view of each layer of the microreactor device used in the one form of this exemplary embodiment.

A microreactor device 500 has pattern members 501A to 501P formed in a laminated form. The aqueous solution A, the aqueous solution B, and distilled water W (60° C.) are respectively introduced from through holes 502a, 503a, and 504a.

The aqueous solution A and the aqueous solution B respectively introduced into the through holes 502a and 503b are sent through an inlet port 502b and an inlet port 503b formed in the second layer (501B). It should be noted that these aqueous solutions are sent at a ratio of aqueous solution A: aqueous solution B=2:1 (vol/vol) Introduction channels (506A and 506B) for the aqueous solution A and the aqueous solution B are formed in the second layer (501B), and the aqueous solution A and the aqueous solution B converge into one flow channel at a confluent channel 508 and are sent.

An ultrasonic transducer 550 is disposed on the uppermost layer 501A at a position corresponding to an upper portion of the confluent channel 508, and the aqueous solution A and the aqueous solution B are mixed within the confluent channel

508. As the aqueous solution A and the aqueous solution B are mixed, $BaO.6Fe_2O_3$ is produced.

The reaction solution (hereafter referred to as the reaction solution C) of the aqueous solution A and the aqueous solution B sent through the confluent channel 508 is discharged from a discharge port 510*a*, is passed through liquid sending holes (through holes) 510*b* to 510*d* provided in the third layer (501C) to the fifth layer (501E), and is sent to a separation channel 512 from an inlet port 510*e* provided in the sixth layer (501F).

The separation channel 512 is so configured as to have a few bends in order to prevent channel clogging due to the particles. The $BaO.6Fe_2O_3$ particles in the reaction solution C sent to the separation channel 512 are precipitated due to gravitational force while being sent through the separation channel 512, and is sent on the lower side of the channel. FIG. 7 shows a cross-sectional view taken along line X-X'. A lower layer solution D570 in which $BaO.6Fe_2O_3$ was separated (condensed) is present downstream of the separation channel 512 and is discharged from a discharge port 514. Meanwhile, a supernatant solution 572 in which $BaO.6Fe_2O_3$ is practically not included is sent along the upper layer and is discharged from a discharge port 516 as a waste solution.

In a laminar flow-dominant channel, since the contribution of a viscous term becomes greater than an inertial term, the flow basically becomes such that the movement of the medium in a direction perpendicular to the flowing direction does not occur. Accordingly, the diffusion of particles due to turbulent flow is prevented, so that separation can be attained efficiently by the precipitation based on the gravitational force.

When the vibrations generated by the ultrasonic transducer 550 are propagated to the separation channel, the particles are agitated by the vibrations, and the formation of a stable laminar flow becomes difficult, making it impossible to attain efficient separation. A section that isolates vibrations (560) is provided between the sixth layer (501F) where the separation channel is provided and the second layer (501B) where the confluent channel is provided.

In this example, a phononic crystal structure 560 is provided in the fourth layer (501D). It should be noted that a vibration proof rubber may be used instead of the phononic crystal structure. Still alternatively, it is possible to use other section that isolates vibrations.

Further, the third layer (501C) and the fifth layer (501E) are formed as partition walls on the upper and lower sides of the fourth layer (501D) where the phononic crystal structure 560 is provided.

Although in this example the woodpile structure is adopted as the phononic crystal structure, this exemplary embodiment is not limited to the same.

The lower layer solution D570 is sent to an inlet port 514*e* provided in the 10th layer (501J) via through holes 514*a* to 514*d*. Meanwhile, the supernatant solution 572 is passed through through holes 516*a* to 516*k* and is discharged from the microreactor device.

The lower layer solution D570 sent to the inlet port 514 is sent to an introduction channel 520' of the lower layer solution D. In addition, the distilled water introduced from 504*a* is sent to an inlet port 504*j* provided in the 10th layer (501J) via through holes 504*b* to 504*i*, and is sent to a distilled water introduction channel 520.

The lower layer solution D570 and the distilled water converge and are sent along a confluent channel 522.

The ultrasonic transducer 550 is provided in the 11th layer (501K) immediately below the 10th layer (501J) in a region corresponding to the confluent channel, so that the distilled water and the lower layer solution D are mixed while being sent along the confluent channel 522, and the mixed solution is discharged from a discharge port 524*a*.

The mixed solution discharged from the discharge port 524*a* is sent to a separation channel 532 from an inlet port 524*f* provided in the 15th layer (501O) via through holes 524*b* to 524*e*.

The separation channel 532 is so configured as to have a few bends in order to prevent channel clogging due to the particles. The $BaO.6Fe_2O_3$ particles in the solution sent to the separation channel 532 are precipitated due to gravitational force while being sent through the separation channel 532, and is sent on the lower side of the channel.

In the same way as the separation channel 512, a lower layer solution E in which $BaO.6Fe_2O_3$ was separated is discharged from a discharge port 526*a*. Meanwhile, a supernatant solution is discharged from a discharge port 528*a* and is discharged to outside the microreactor device from a discharge port 528*b*.

In addition, a pH sensor 530 is disposed on a channel inner wall between the discharge ports 526*a* and 528*a* of the separation channel 532. The pH sensor 530 is capable of detecting the pH of the supernatant solution sent along the separation channel 532.

In this exemplary embodiment, it is preferred that the device be configured such that the pH of the supernatant solution becomes 7.0±0.5. Namely, in a case where a desired pH cannot be obtained in a single procedure of the separation step, the dilution (mixing with distilled water) step, and the separation step, it is preferred that the device be configured such that the pH falls within the aforementioned range by repeating the dilution step and the separation step.

The lower layer solution E whose supernatant solution reached the desired pH range is discharged from a discharge port 526 to outside the microreactor device. As the lower layer solution E is subjected to such as suction and filtration, it is possible to obtain the $BaO.6Fe_2O_3$ particles.

Here, when the vibrations generated by the ultrasonic transducer 550 formed on the 11th layer (501K) are propagated to the separation channel 532, the particles in the fluid are agitated by the vibrations, making it impossible to attain efficient separation. The section 560 for isolating vibrations is provided on the 13th layer (501M) which is present between the 15th layer (501O) where the separation channel is provided and the 11th layer (501K) where the ultrasonic transducer 550 is provided.

In this example, the phononic crystal structure 560 is provided in the 13th layer (501M). It should be noted that a vibration proof rubber may be used instead of the phononic crystal structure. Still alternatively, it is possible to use other section that isolates vibrations.

Further, the 12th layer (501L) and the 14th layer (501N) are formed as partition walls on the upper and lower sides of the 13th layer (501M) where the phononic crystal structure 560 is provided.

Although in this example the woodpile structure is adopted as the phononic crystal structure, this exemplary embodiment is not limited to the same.

Figure 8A:
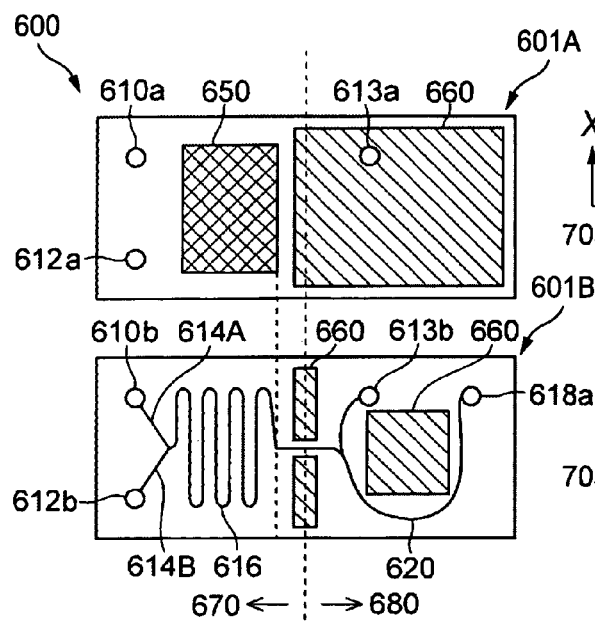
FIGS. 8A to 8C are conceptual diagrams illustrating portions of pattern members of another microreactor device which can be suitably used in Example 1.
Figure 8B:
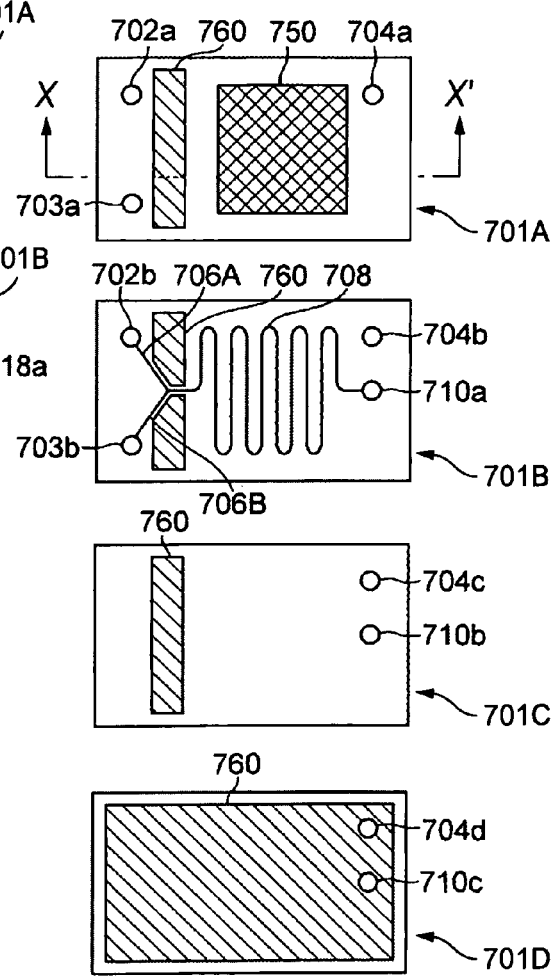
Figure 8C:
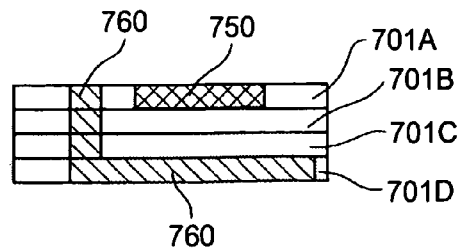

FIGS. 8A to 8C are conceptual diagrams illustrating portions of pattern members of another microreactor device which can be suitably used in this example.

FIG. 8A shows a first layer (601A), which is an uppermost layer, and a second layer (601B), which is a lower layer with respect to it.

In the microreactor device shown in FIG. 8A, a confluent channel 616 and a separation channel 620 are formed in the same pattern member. The aqueous solution A and the aqueous solution B are sent from inlet ports 610a and 612a at a ratio of 2:1 (vol/vol), are respectively sent to introduction channels 614R and 614B via inlet ports 610b and 612b, and are sent to the same channel at the confluent channel 616.

An ultrasonic transducer 650 is disposed on the first layer (601A) at a position corresponding to the confluent channel 616. As a result, the aqueous solution A and the aqueous solution B are mixed within the confluent channel 616. As the aqueous solution A and the aqueous solution B are mixed, $BaO.6Fe_2O_3$ is produced. The reaction solution (hereafter referred to as the reaction solution C) of the aqueous solution A and the aqueous solution B sent through the confluent channel 616 is sent to the separation channel 620 together with the distilled water sent from 613a.

A section 660 that isolates vibrations is provided on the first layer (601A) in a region corresponding to the separation channel 620. Further, in this exemplary embodiment, a section that isolates vibrations is provided on the second layer (601B) as well, so that the vibrations generated by the ultrasonic transducer 650 can be effectively isolated in the vertical direction. Thus, a vibration portion 670 and a vibration isolation portion 680 are formed.

In this exemplary embodiment, the numbers, the layout, and the like of the section that isolates vibrations and the section that generates vibrations can be appropriately selected according to the objective.

FIG. 8C shows only a first layer (701A) to a fourth layer (701D), which correspond to the first layer (501A) to the fourth layer (501D) in FIG. 6.

In the microreactor device shown in FIG. 8B, an ultrasonic transducer (section that generates vibrations) 750 is formed on a region of the first layer (701A) corresponding to a meandering portion of a confluent channel 708, and a section 760 that isolates vibrations is provided in a region corresponding to an upstream portion thereof. Further, on the second layer (701B) as well, the section 760 that isolates vibrations is provided upstream of the confluent channel in such a manner as to sandwich the microchannel. Further, the section 760 that isolates vibrations is provided on the third layer (701C) as well. FIG. 8C shows a cross-sectional view taken along line X-X' of the microreactor device in which the first layer (701A) to the fourth layer (701D) shown in FIG. 8B are laminated. It should be noted that, in FIG. 8C, the confluent channel formed in the second layer (701B) is omitted. As shown in FIG. 8C, the vibrations generated by the ultrasonic transducer 750 are confined not only in the laminated direction but also within the layer (the upper right region surrounded by the section that isolates vibrations in FIG. 8C) by the section that isolates vibrations. Accordingly, the vibrations are not transmitted to introduction channels 706A and 706B. As a result, a uniform diffusion reaction can take place in the vicinity of the confluent portion due to the current of flow, and the prevention of precipitation of particles and improvement of the reaction rate of the reaction solution by the ultrasonic agitation can be subsequently performed, so that this arrangement excels in the uniformity in the diameter of particles generated and in control of the particle composition.

In FIG. 8B, the aforementioned phononic crystals can be used as the section that isolates vibrations, but it is also possible to use other section such as an elastic rubber or a vacuum layer, and the section that isolates vibrations may preferably be selected appropriately in correspondence with the desired properties.

Example 2

Synthesis of Gold/Iron Oxide Magnetic Composite Nanoparticles

Since gold specifically forms S—Au bonding with a sulfur-containing compound, composite nanoparticles in which gold nanoparticles are solidified on surfaces of iron oxide nanoparticles are anticipated to be applied as magnetic carriers for specific molecules such as biological molecules, and applications in the bioengineering field are expected. In this example, the microreactor device of this exemplary embodiment was used in the synthesis of composite nanoparticles in which gold nanoparticles are solidified on surfaces of iron oxide nanoparticles.

<Synthesis Procedure>

An $Fe(NO_3).9H_2O$ solution (solution A) of 0.1 mol/L was introduced into the microreactor and was sent while being heated at 100° C., thereby obtaining a dispersion liquid of magnetic iron oxide nanoparticles ($\gamma$-Fe $(NO_3)_3$+$Fe_3O_4$).

An aqueous solution (solution B) containing gold ions ($HAuCl_4$) of 0.002 mol/L, polyvinyl alcohol (PVA), and 2-propanol was added to the dispersion liquid, and was sent along a microchannel while being agitated by ultrasonic waves. At this time, Ar bubbling was jointly employed at the same time. In addition, irradiation with $^{60}Co$ $\gamma$ rays under agitation with low-frequency oscillations is also preferable.

As a result, composite nanoparticles in which gold nanoparticles are solidified on surfaces of $\gamma$-$Fe(NO_3)_3$ particles are obtained.

Next, the composite nanoparticles were separated using a permanent magnet while the reaction solution containing the composite nanoparticles is being sent along the flow channel with vibrations isolated.

Figure 9A:
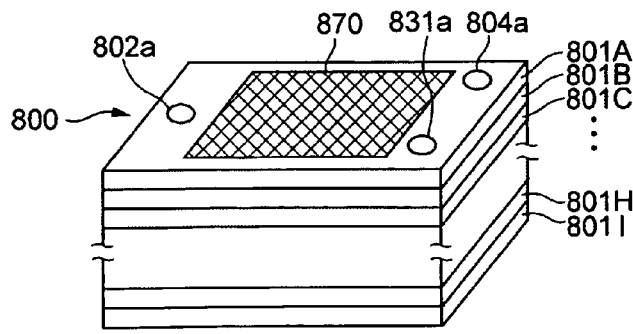
FIGS. 9A and 9B are conceptual diagrams of the microreactor used in Example 2.
Figure 9B:
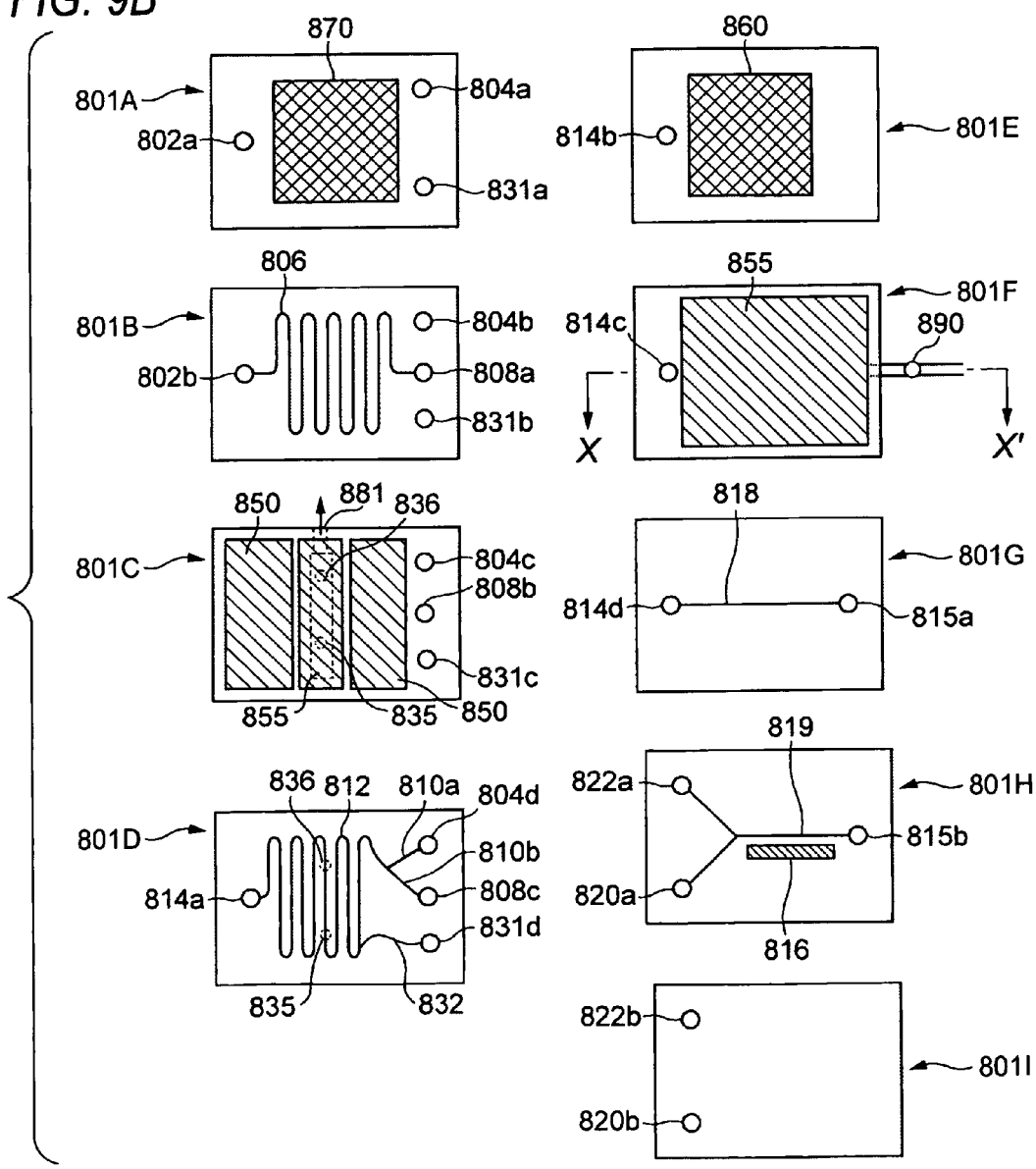

FIGS. 9A and 9B are conceptual diagrams of the microreactor used in Example 2.

As shown in FIG. 9A, a microreactor device 800 is formed by laminating pattern members 801A to 801I. FIG. 9B is a plan view of the pattern members 801A to 801I.

A heater 870 is provided on a first layer (801A), and the solution A sent from an inlet port 802a is sent to a confluent channel 806 via an inlet port 802b. The solution A is heat to 100° C. by the heater 870, and a dispersion liquid of $\gamma$-$Fe_2O_3$+$Fe_3O_4$ is produced while being sent along the confluent channel 806. The iron nanoparticle dispersion liquid (solution C) thus obtained is discharged from a discharge port 808a, and is sent from an introduction port 808c via a port 808b to an introduction channel 810b provided in the fourth layer (801D).

Meanwhile, the solution B is introduced from an inlet port 804a provided in the first layer, and is sent from an introduction port 804d into an introduction channel 810a of the fourth layer (801D) via through holes 804b and 804c.

The solution C and the solution B converge in the fourth layer (501D), and the converged solution is sent through a confluent channel 812.

An ultrasonic transducer 860, which is the section that generates vibrations, is formed in a region of the fifth layer (801E) corresponding to the confluent channel 812. In addition, the section that generates vibrations is not limited to the ultrasonic transducer, and may be a low-frequency vibrator. In that case, $\gamma$-ray irradiation with $^{60}Co$ is preferably performed at the same time. Furthermore, the joint use of Ar (argon gas) bubbling in conjunction with the ultrasonic vibrations may be suitably performed.

In this example, ultrasonic vibrations and Ar bubbling are jointly carried out. Ar (argon gas) is introduced from an inlet port 831*a* provided in the first layer, is sent from an inlet port 831*d* into an Ar introduction channel 832 provided in the fourth layer via through holes 831*b* and 831*c*, and is then introduced (blown) into the confluent channel 812.

Figure 10:
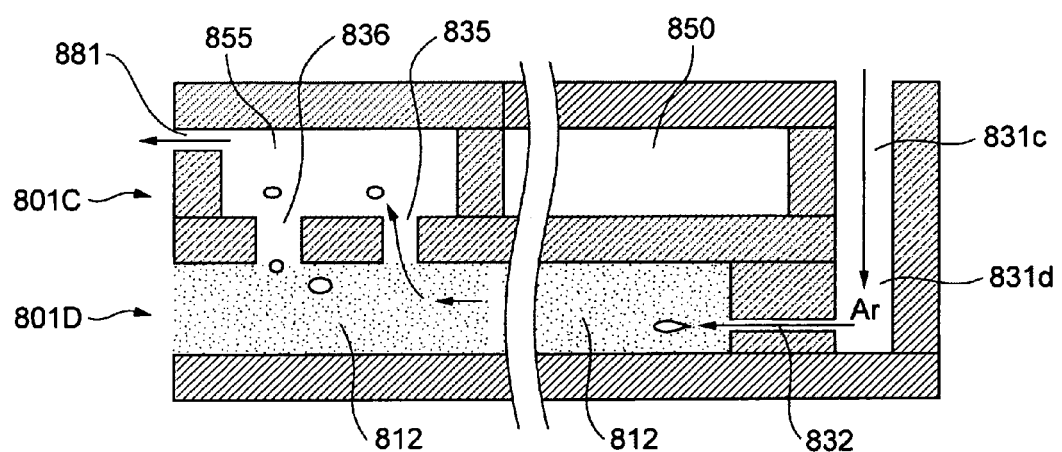
FIG. 10 is a schematic cross-sectional view illustrating the principle of Ar bubbling employed in Example 2.

FIG. 10 is a schematic cross-sectional view illustrating the principle of Ar bubbling employed in this example.

Ar is sent through through holes 831*c* and 831*d*, and is blown from the Ar introduction channel 832 into the confluent channel 812 of the solution C and the solution B. Ar bubbles are produced in the confluent channel 812, and the mixing of the solution C and the solution B is further promoted by these bubbles.

Meanwhile, in this example, Ar should preferably be collected after the mixing of the solution C and the solution B. This is because the formation of a stable laminar flow is required in the subsequent step of separation of the composite nanoparticles, and if Ar is present within the flow channel, channel clogging and the occurrence of turbulent flow can result.

Referring to FIGS. 9 and 10, two through holes (835 and 836) are provided on the upper sides in the interior of the confluent channel 812 in the fourth layer (801D). In addition, an air layer 855 is formed in the third layer (801C) above the region where those through holes are provided. Ar introduced into the confluent channel 812 moves through the through holes into the upper air layer. In addition, an Ar discharge port 881 is provided in the air layer, a valve and a cylinder (not shown) are mounted to the Ar discharge port 881 so as to discharge the same amount of the gas (Ar) as that of the Ar supplied.

Meanwhile, a vacuum layer 850 is provided in a region of the third layer (801C) other than the air layer 855, so that the heat generated from a heater 870 of the first layer is prevented from being transmitted to the solution B and the solution C flowing through the fourth layer.

It should be noted that the air layer 855 and the vacuum layer 850 of the third layer (801C) also function to isolate from the ultrasonic vibrations generated in the fifth layer (801E) from being transmitted to the second layer (801B).

In the confluent channel, the solution B and the solution C are mixed by the joint use of the ultrasonic vibrations and Ar bubbling, and the iron oxide nanoparticles in the solution C are coated with gold. Namely, the solution D, which is the reaction solution of the solution B and the solution C, contain gold/iron oxide magnetic composite nanoparticles generated. The solution D is discharged from a discharge port 814*a*, is introduced into an inlet 814*d* provided in the seventh layer (801G) via through holes 814*b* and 814*c*, and is then sent through a Helmholtz type resonator channel 818.

As the solution D is sent through the Helmholtz type resonator channel 818, the vibrations of the solution D are eliminated. A detailed description will be given later. The solution D which has been sent through the Helmholtz type resonator channel 818 is discharged from the discharge port 815*a* and is sent from an inlet port 815*b* to a separation channel 819 of the eighth layer (801H).

A permanent magnet 816 is provided on the eighth layer (801H), and when the solution D is sent through the separation channel 819, gold/iron oxide magnetic composite nanoparticles in the solution are selectively accumulated on the permanent magnet 816 side of the separation channel 819. If the flow channel is separated on the downstream side of the permanent magnet, the gold/iron oxide magnetic composite nanoparticles are separated and discharged from a discharge port 820*a* of the permanent magnet side channel. Accordingly, as the solution discharged from a discharge port 820*b* is collected, it is possible to collect the gold/iron oxide magnetic composite nanoparticles.

In the eighth layer (801H), a stable laminar flow should preferably be formed in performing the separation and condensation by means of the permanent magnet. The air layer 855 is formed in the sixth layer (816F) between the fifth layer (801E) where the ultrasonic transducer 860 is formed and the eighth layer (801H) where the separation channel 819 is formed, so that the vibrations generated in the fifth layer (801E) by the action of the Helmholtz type resonator are isolated, thereby forming a stable laminar flow in the separation channel 819.

Figure 11A:
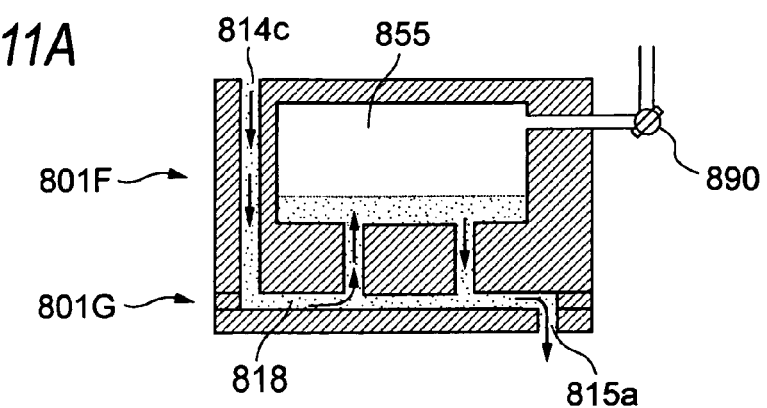
FIG. 11A is a schematic cross-sectional view illustrating an exemplary embodiment in which a Helmholtz type resonator is used as a section that isolates vibrations.

FIG. 11A is a cross-sectional view, taken along line X-X', of the sixth layer (801F) and the seventh layer (801G) in FIGS. 9A and 9B. In the sixth layer (801F), the through hole 814*c*, through which the solution D is sent is formed, and the air layer 855 is also formed.

The Helmholtz type resonator channel 818 is provided in the seventh layer (801G), so that the vibration of the solution D is eliminated by the upper air layer. In addition, the air layer 855 is provided with pipes for introduction and discharge of the gas and connected to the outside of the microreactor device, and a valve 890 is provided so as to be able to appropriately change the pressure within the air layer, the kind of gas, and the like.

In a case where the fluid sent through the Helmholtz type resonator channel pulsates, the fluid is sent into the air layer in accompaniment of pulsation. In the air layers as the air vibrates in conjunction with the pulsation of the solution D, these pulsations are absorbed, so that the solution D which is discharged from a discharge port 815*a* is sent more stably.

In addition, in a case where Ar remains in the solution D, the residual Ar is discharged into the air layer, thereby making it possible to eliminate the residual Ar in the solution D.

In addition, although the Helmholtz type resonator channel is used as the sixth layer (801F) in the above-described example, the vacuum layer 850 may be used instead.

Figure 11B:
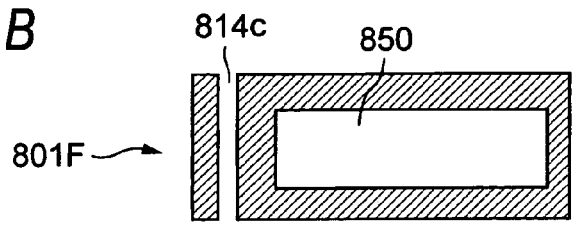
FIG. 11B is a schematic cross-sectional view of a sixth layer in FIGS. 9A and 9B in a case where a vacuum layer is used as the sixth layer.

A cross-sectional view of the sixth layer in FIGS. 9A and 9B in a case where the vacuum layer is used as the sixth layer is shown in FIG. 11B.

It should be noted that this exemplary embodiment is not limited to the above-described forms of exemplary embodiment, and various modifications are possible without departing from the gist of the invention. Furthermore, component elements in the respective forms of exemplary embodiment may be arbitrarily combined without departing from the gist of the invention.

What is claimed is:

1. A microreactor device comprising:
    a first inlet port configured to introduce a first fluid;
    a second inlet port configured to introduce a second fluid;
    a first outlet port;
    a second outlet port;
    a microchannel that includes a first channel to which the first inlet port and the second inlet port are connected so as to mix the first fluid and the second fluid in the first channel and a second channel to which the first channel, the first outlet port and the second outlet port are connected, the second channel being formed downstream of the microchannel with respect to the first channel; and
    a section that isolates the second channel from the first channel with respect to vibrations applied to the first channel,
    wherein the first outlet port and the second outlet port are adjacent to each other on a lower inner face of the second channel, and wherein the section that isolates the second channel from the first channel with respect to the vibrations applied to the first channel is at least a phononic crystal structure.

2. The microreactor device according to claim 1, wherein the section that isolates the second channel from the first channel with respect to the vibrations applied to the first channel is a section that isolates vibrations with a frequency of about 1 Hz to about 10 MHz.

3. The microreactor device according to claim 1, wherein the phononic crystal structure is formed by laminating pattern members.

4. The microreactor device according to claim 3, wherein the phononic crystal structure is a woodpile structure.

5. The microreactor device according to claim 1, further comprising a section that generates vibrations to the first channel of the microchannel.

6. The microreactor device according to claim 5, wherein the section that generates vibrations to the first channel is a section that generates vibrations with a frequency of about 1 Hz to about 10 MHz.

7. The microreactor device according to claim 5, wherein the section that generates vibrations to the second channel is at least one selected from the group consisting of:
a section comprising a mechanical vibrating plate disposed outside the microchannel to apply vibrations to the microchannel;
a section comprising an ultrasonic vibration source to apply ultrasonic vibrations;
a section comprising a rotor or an agitator disposed in the microchannel to generate vibrations by a force from an outside; and
a section that generates vibrations of a predetermined frequency by application of a voltage to a piezoelectric transducer.

8. The microreactor device according to claim 1, wherein the microreactor device is formed by laminating pattern members.

9. The microreactor according to claim 1, wherein the second outlet port is downstream from the first outlet port.

* * * * *